(12) United States Patent
Rinklake

(10) Patent No.: US 9,046,123 B2
(45) Date of Patent: Jun. 2, 2015

(54) SECURING EYE AND SECURING SYSTEM

(75) Inventor: Kai Rinklake, Neuwied (DE)

(73) Assignee: Skylotec GmbH, Neuwied (DE)

( * ) Notice: Subject to any disclaimer, the term of this patent is extended or adjusted under 35 U.S.C. 154(b) by 0 days.

(21) Appl. No.: 14/240,554

(22) PCT Filed: Jun. 29, 2012

(86) PCT No.: PCT/EP2012/002741
§ 371 (c)(1),
(2), (4) Date: Feb. 24, 2014

(87) PCT Pub. No.: WO2013/029709
PCT Pub. Date: Mar. 7, 2013

(65) Prior Publication Data
US 2014/0217255 A1    Aug. 7, 2014

(30) Foreign Application Priority Data
Aug. 31, 2011  (DE) .................... 20 2011 105 177 U

(51) Int. Cl.
*B60P 3/079* (2006.01)
*F16B 45/00* (2006.01)
*A62B 35/00* (2006.01)
*F16B 19/10* (2006.01)

(52) U.S. Cl.
CPC ............. *F16B 45/00* (2013.01); *A62B 35/0068* (2013.01); *F16B 19/109* (2013.01)

(58) Field of Classification Search
CPC .......... F16B 45/00; F16B 19/109; A47F 5/08; B60P 3/079; B60P 7/0807; B60P 7/0815; B60P 7/08; B61D 45/001; B66C 1/10; A62B 35/0068
USPC ............. 248/231.91, 925, 239, 339, 301–306
See application file for complete search history.

(56) References Cited

U.S. PATENT DOCUMENTS

| | | | | |
|---|---|---|---|---|
| 626,040 | A * | 5/1899 | Rowlands | 248/316.3 |
| 1,106,909 | A * | 8/1914 | Zifferer | 248/231.91 |
| 3,371,951 | A * | 3/1968 | Bryant | 294/82.1 |
| 3,845,527 | A * | 11/1974 | Lombardi | 24/575.1 |
| 4,491,358 | A * | 1/1985 | Choung | 294/101 |
| 4,884,931 | A * | 12/1989 | Revol et al. | 411/60.1 |
| 6,068,226 | A * | 5/2000 | Anders | 248/231.91 |
| 2010/0207406 | A1* | 8/2010 | Thomeczek | 294/1.1 |

FOREIGN PATENT DOCUMENTS

| | | |
|---|---|---|
| DE | 1213584 B | 3/1966 |
| DE | 3822690 C1 | 3/1990 |
| FR | 2766145 A1 | 1/1999 |
| GB | 237355 A | 7/1925 |
| GB | 1170001 A | 11/1969 |

* cited by examiner

*Primary Examiner* — Nkeisha Smith
(74) *Attorney, Agent, or Firm* — Robert Curcio; DeLio, Peterson & Curcio, LLC

(57) ABSTRACT

A securing lug having a bolt and a securing ring which is connected pivotably to the bolt, as a result of which the pivoting-angle range of the securing ring is limited to less than 180°.

9 Claims, 5 Drawing Sheets

SECURING EYE AND SECURING SYSTEM

BACKGROUND OF THE INVENTION

1. Field of the Invention

The invention relates to a securing eye or lug to form a releasable attachment point and to a securing system which comprises a securing eye of this kind.

2. Description of Related Art

Detachable attachment points are used where persons need to work under secure conditions at a considerable height, e.g., when cleaning the outsides of windows on large buildings. A securing system which is referred to as a detachable attachment point may, in this case, comprise a plurality of anchoring elements which are solidly anchored into the outside wall of the building in various positions and which serve to receive, in such a way that it can be released, a securing eye which the person to be secured inserts, as required, in the particular anchoring element involved. The person is then able to secure himself to this securing eye by means of a carabiner for example. The principal advantage of an attachment point which, rather than being installed in a fixed position where the securing eye is fixed permanently into the wall of the building, is detachable lies in the fact that it does not draw attention to itself visually.

A securing system to form a releasable attachment point is known for example from EP 0 379 282 B1. This securing system comprises a bush, to be solidly anchored into the wall of a building for example, and a securing eye which has a spigot which is intended to be inserted in the bush. Following on from the spigot there is a securing ring which serves to receive a carabiner. The spigot and securing ring are connected solidly together in this case or in other words are integral with one another. The disadvantage which this design involves is that the securing eye has to be inserted in the bush in a defined orientation and should not twist around while in use because it is not permissible for the securing ring to be loaded in every direction.

To overcome this disadvantage, similar securing systems have been developed where the securing ring is connected to the spigot to be pivotable on an axis which lies perpendicular to the longitudinal axis of the spigot. The additional degree of freedom which the securing ring has ensures that it is almost always loaded in the permitted direction. In constructional terms, the securing ring is given the ability to pivot by connecting it to a mounting shaft which is mounted to be rotatable in a transverse hole through the spigot. This produces an ability to pivot through an angular range of pivot which is more than 180° and which in particular is limited only by the abutment of the securing ring against the spigot itself or against the adjacent wall.

However, something which has proved to be a problem in this case is that, due to the ability of the securing ring to pivot, a carabiner which is attached thereto regularly comes into contact with the wall of the building, as a result of which the latter may be damaged or dirtied.

BRIEF SUMMARY OF THE INVENTION

Taking the above prior art as a point of departure, the object underlying the invention was to specify a securing system of the generic kind which had been improved. The intention was in particular that damage to or dirtying of a wall of a building due to a carabiner attached to a securing eye of the securing system would be largely avoided by the improved securing system.

This object is achieved by a securing eye according to the claims. Advantageous embodiments of the securing eye according to the invention form the subject matter of the dependent claims and can be seen from the following description of the invention.

The above and other objects, which will be apparent to those skilled in the art, are achieved in the present invention which is directed to a securing eye comprising: a spigot; a securing ring pivotably connected to the spigot; and one or two abutments limiting the angular range of pivot of the securing ring to a range extending between 90°, such that the range is between +45° and −45° from an alignment where the longitudinal axis of the spigot is within a plane defined by the securing ring, and 120°, such that the range is between +60° and −60° from an alignment where the longitudinal axis of the spigot is within a plane defined by the securing ring.

The one or two abutments are designed in such a way that they are free of the limitation on the angular range of pivot if there is an increased load on the securing ring.

The spigot and the securing ring are preferably formed from metal and the one or two abutments are formed from plastics material.

The one or two abutments have an intended point of fracture and/or may be replaceable.

In a second aspect, the present invention is directed to a securing system having a securing eye comprising: a spigot; a securing ring pivotably connected to the spigot; one or two abutments limiting the angular range of pivot of the securing ring to a range extending between 90°, such that the range is between +45° and −45° from an alignment where the longitudinal axis of the spigot is within a plane defined by the securing ring, and 120°, such that the range is between +60° and −60° from an alignment where the longitudinal axis of the spigot is within a plane defined by the securing ring; and a securing bush in which the spigot of the securing eye is removeably insertable.

BRIEF DESCRIPTION OF THE DRAWINGS

The invention will be explained in more detail herein below with reference to the drawings, in which.

DETAILED DESCRIPTION OF THE INVENTION

The idea on which the invention is based is that, in the case of a securing system whose securing eye is designed to have a spigot and a securing ring which is mounted to be pivotable relative thereto, the risk of damage to or dirtying of a wall of a building caused by contact with a carabiner fastened to the securing ring can be effectively and easily avoided by limiting the angular range of pivot of the securing ring to less than 180° (and in particular to less than ±90° from the co-axial alignment of the securing ring relative to the spigot). In this way, the advantages of a securing ring of a securing eye where the securing ring is mounted to be pivotable on the spigot, namely the assurance that the securing ring will always be correctly loaded, can be combined with the advantage of a design where the securing eye is not movable, namely that there is less risk of damage to or dirtying of a wall of a building.

Provision is preferably made for the angular range of pivot of the ring to be limited to a range from 120° to 90° (and in particular to between ±60° and ±45° from the co-axial alignment of the securing ring relative to the spigot).

Figure 1:
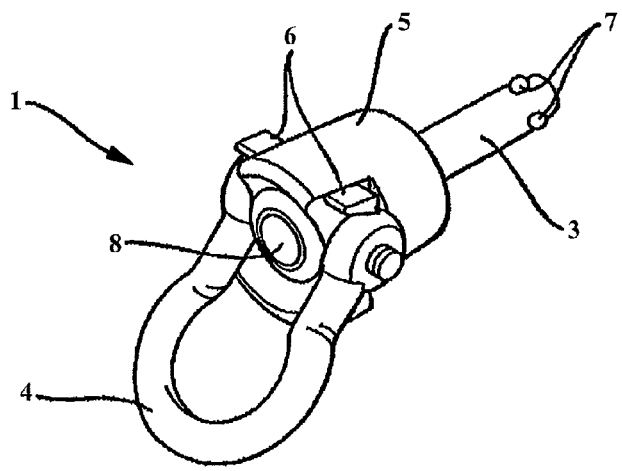
FIG. 1 is an isometric view of a securing eye according to the invention.
Figure 2:
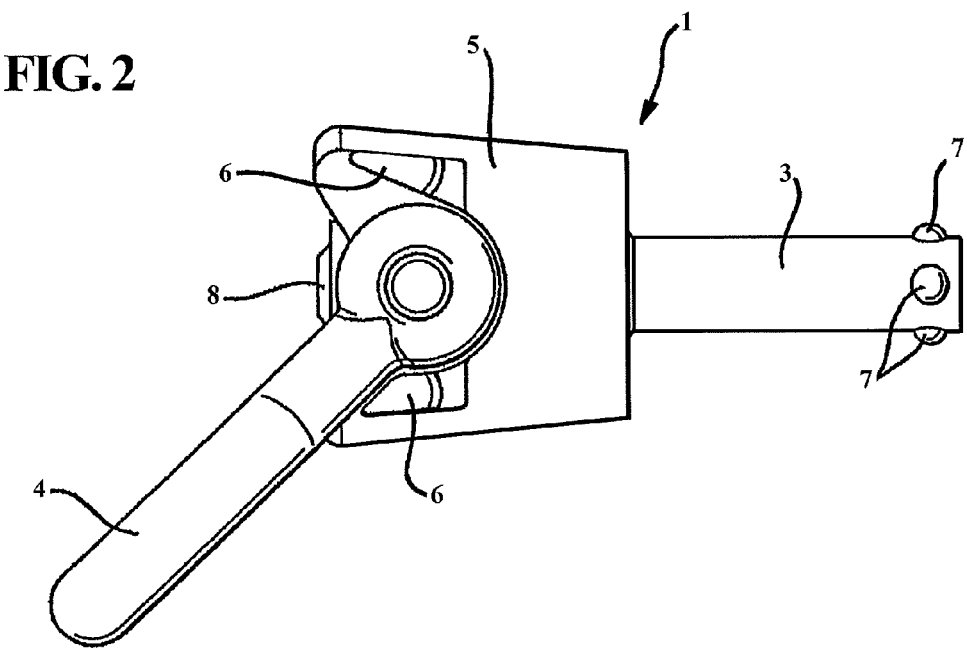
FIG. 2 is a view from the side of the securing eye shown in FIG. 1.
Figure 3:
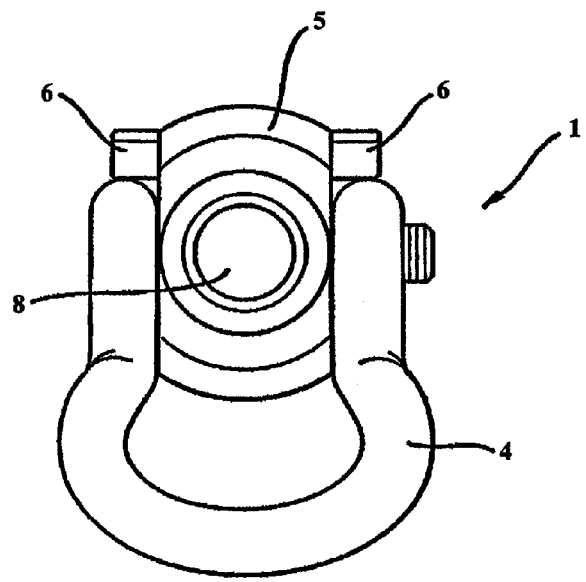
FIG. 3 is a view from the front of the securing eye shown in FIG. 1.
Figure 6:
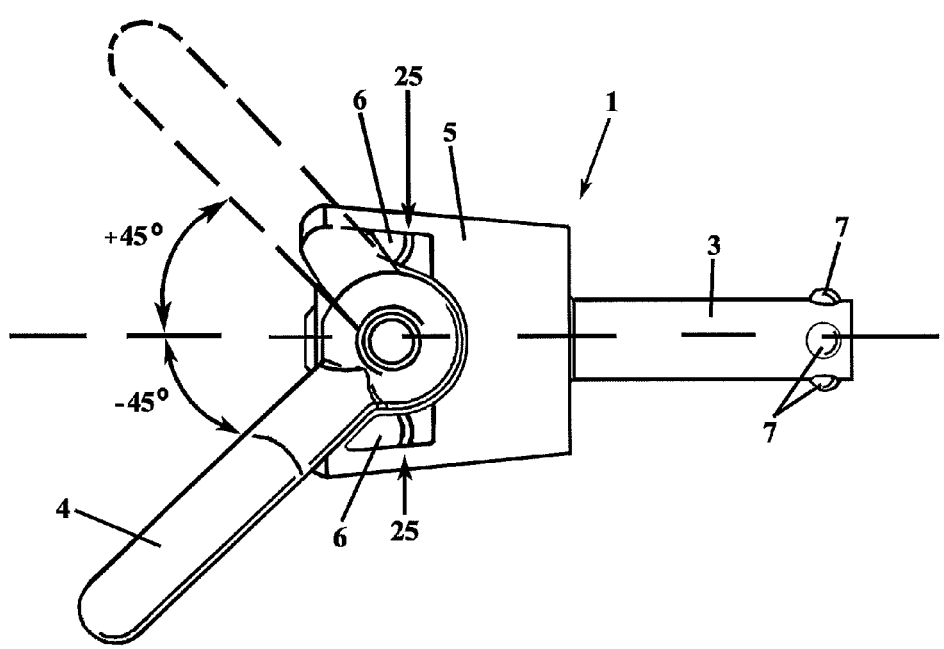
FIG. 6 is a view from the side of the securing eye depicted in FIGS. 1-3 showing the first embodiment of the present invention where an abutment limits the angular range of pivot to 90°, such that the range is between −45° and +45°.

FIG. 6 is a view from the side of the securing eye depicted in FIGS. 1-3 showing the first embodiment of the present invention where an abutment ring 5 with four abutment members 6 (two of which are shown in FIG. 6) limits the angular range of pivot of the securing ring to a range of 90°, such that the range is between −45° and +45° from an alignment where the longitudinal axis of the spigot 3 is within a plane defined by the securing ring 4. The position of +45° of the securing ring 4 is shown in dashed lines. The intended points of fracture 25 are depicted therein.

Figure 7:
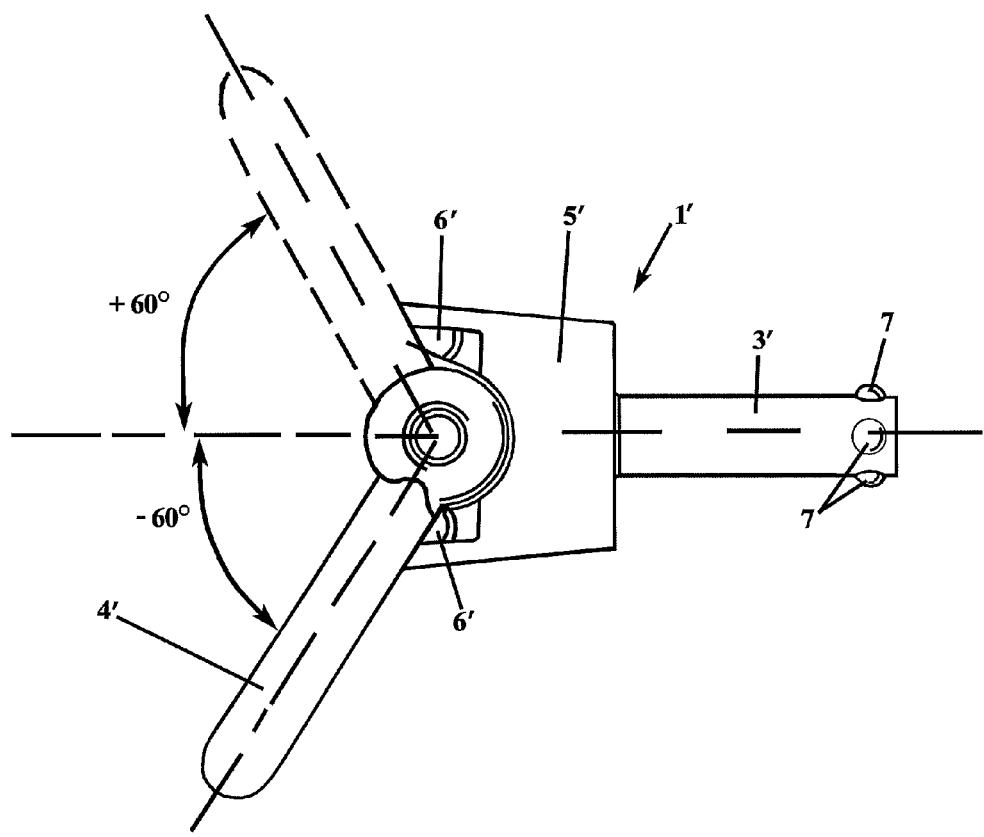
FIG. 7 is a view from the side of the securing eye depicted in FIGS. 1-3 showing the second embodiment of the present invention where an abutment limits the angular range to 120°, such that the range is between −60° and +60°.

FIG. 7 is a view from the side of the securing eye depicted in FIGS. 1-3 showing the second embodiment of the present invention where an abutment ring 5' with four abutment members 6' (two of which are shown in FIG. 76) limits the angular range to 120°, such that the range is between −60° and +60°. The position of +60° of the securing ring 4' is shown in dashed lines.

The angular range of pivot of the securing eye according to the invention may, in accordance with the invention, be limited by one abutment or two abutments (which limit it in both the directions of movement). Provision is preferably made in this case for the abutments to be so designed that they are free of the limitation on the angular range of pivot if there is an increased load on the securing ring. Hence, provision may be made for the abutments to limit the angular range of pivot only when the tractive load which is exerted on the securing ring and of which a component of force acts on one of the abutments is comparatively low (e.g., is a maximum of 100 N, 200 N, 300 N, 400 N, or 500 N) and for it to free (i.e., no longer limit) the angular range of pivot if the tractive load, and hence the load applied by the securing ring to the relevant abutment as well, exceeds this limiting value. In the event of the securing eye going into action, e.g., in the event of a person secured to it falling, as a result of which the securing eye is loaded at least by the bodyweight of the person secured, the given abutment thus frees the angular range of pivot, as a result of which the entire angular range of pivot (limited only by, for example, abutment of the securing ring against the wall of the building) is freed.

In a preferred embodiment of the securing eye according to the invention, the spigot and the securing ring may be formed (largely) from metal and in particular from steel, while the abutments limiting the angular range of pivot may be formed from plastics material. In this way, the components which perform the actual securing function may be produced from high-strength steel whereas the abutments which serve merely to protect the wall of the building may be inexpensively produced from plastics material.

Where the abutments are formed from plastics material, an intended point of fracture may also be incorporated in them, and provision may be made for this in a preferred embodiment of the securing eye according to the invention. The given abutment may break off in a defined way at this intended point of fracture when loaded by the securing ring in the event of its going into action.

To enable the securing eye according to the invention to continue in fully functional use even after it has gone into action and an abutment has broken off, provision is preferably made for the abutments to be connected to the spigot or the securing ring in such a way as to be replaceable.

The invention also relates to a securing system having a securing eye according to the invention and a securing bush which is intended for anchoring in a wall and in which the securing eye can be inserted (in particular lockably).

Figure 4:
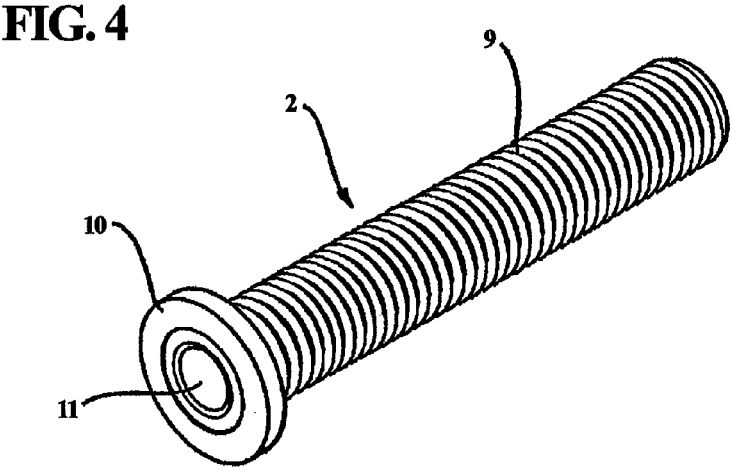
FIG. 4 shows a securing bush for use with the securing eye shown in FIGS. 1 to 3.
Figure 5:
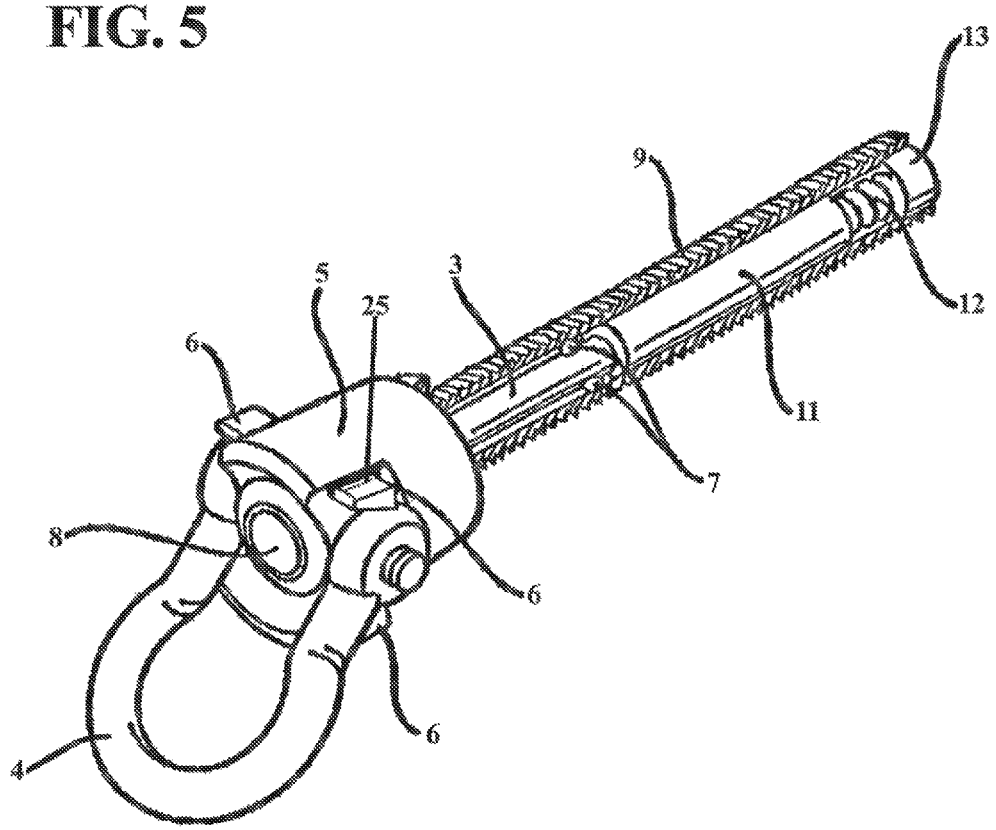
FIG. 5 is an isometric view, partly in section, of a securing system comprising the securing eye shown in FIGS. 1 to 3 and the securing bush shown in FIG. 4.

FIGS. 1 to 7 show embodiments of securing system according to the invention (see, e.g., FIG. 5) which comprises a securing eye 1 (see FIGS. 1 to 3, 6, and 7) and a securing bush (see FIG. 4).

The securing eye 1 comprises a main body of steel which forms a spigot 3, having a smooth-faced circumferential surface, which is intended for insertion in the securing bush 2 shown in FIG. 4. At that end of the main body which is not intended for insertion in the securing bush 2, the said main body is provided with a rotatable securing ring 4. The securing ring 4 is pivotable in this case on an axis which lies perpendicular to the longitudinal axis of the spigot 3. The angular range of pivot of the securing ring 4 is limited by an abutment ring 5 of plastics material which is fastened to the main body in such a way as to be replaceable and which comprises four projecting abutment members 6 which limit the range of pivot to approximately ±45° from a co-axial alignment of the securing ring 4, i.e. an alignment where the longitudinal axis of the spigot 3 is within a plane defined by the securing ring 4.

At its end for insertion, the spigot 3 of the securing eye 1 is provided with a total of four spherical locking members 7. These are mounted to be moveable within openings in the circumferential surface of the spigot 3 and are held in the locking position shown in FIGS. 1, 2 and 5 by a locking rod (not shown) which is guided to be movable within the spigot (in the direction defined by the longitudinal axis thereof). In the locking position, the locking members 7 project from the circumferential surface of the spigot 3 and, when a securing eye 1 is inserted in the securing bush 2, engage in appropriate depressions on the inside of the securing bush 2. The securing eye 1 is thus secured against coming free from the securing bush 2 when this is not wanted. Pressure is applied to the locking rod by a spring member (not shown) which is also arranged inside the main body of the securing eye, as a result of which the locking rod is held in a position which produces the locking position of the locking members 7.

To insert the spigot 3 of the securing eye 1 in the securing bush 2 and to release it from its hold therein, it is necessary for the locking members 7 to be displaced sufficiently far into the interior of the spigot 3 for them no longer to project substantially from the circumferential surface thereof. This is done by pressing in an actuating member 8 connected to the locking rod, as a result of which the locking rod is displaced a defined distance (in the direction defined by the longitudinal axis) within the spigot. When this is done, a portion of the locking rod where the latter is of a reduced outside diameter is brought into contact with the locking members 7 and the latter are thus able to move back into the interior of the spigot 3. Because the locking rod is spring-loaded into the locking position, it moves back into the locking position shown in FIGS. 1, 2 and 5 automatically once the actuating member 8 is released.

The securing bush 2 is intended to be fixed permanently in a wall (not shown) such for example as a wall of a building. It comprises a threaded sleeve 9 having an outside thread and, fastened to one end of its main body, a ring for contact 10 which limits the depth of insertion of the threaded sleeve 9 in a hole in the wall and also acts as a pivot bearing for the securing eye 1 inserted in the securing bush 2. The securing bush 2 also comprises a closing-off or sealing-off cap 11 in sleeve form by means of which the interior of the main body is closed off from the surroundings even when there is no securing eye 1 inserted. The sealing-off cap 11 is loaded into the position shown in FIG. 4, in which it closes off the receiving opening formed by the ring for contact 10, by means of a (cylindrical coil) spring 12. For this purpose, the spring 12 extends into the closing-off cap 11 in sleeve form at one end and by the other end is supported against a closing-off member 13 which closes off the opposite end of the threaded sleeve 9 from the ring for contact 10. When the spigot 3 of the securing eye 1 is inserted, the closing-off cap 11 is displaced by the spigot 3 in the direction of the closing-off member 13 in opposition to the force exerted by the spring 12.

The purpose of the spring 12 is not only to displace the closing-off cap 11 towards the closing-off position shown in FIG. 4 when there is not a securing eye 1 inserted but also to assist the release of the securing eye 1 from the securing bush 2, as soon as the locking members 7 are released by actuating the actuating member 8.

The purpose of the outside thread on the threaded sleeve 9 is to fix the securing bush 2 securely in the wall. Provision is made in this case either for the securing bush to be fixed in a hole in the wall over the entire length of the threaded sleeve 9 or, where the thickness of the wall is less than the length of the threaded sleeve 9, for the securing bush 2 to be secured by screwing a securing nut (not shown) onto the opposite end of the threaded sleeve 9 from the ring for contact.

While the present invention has been particularly described, in conjunction with the specific preferred embodiment(s), it is evident that many alternatives, modifications, and variations will be apparent to those skilled in the art, in light of the foregoing description. It is therefore contemplated that the appended claims will embrace any such alternatives, modifications, and variations as falling within the true scope and spirit of the present invention.

Thus, having described the invention, what is claimed is:

1. A securing eye comprising:
a spigot;
a securing ring pivotably connected to the spigot; and
one or two abutments limiting an angular range of pivot of the securing ring to a range extending between 90°, such that the angular range is between +45° and −45° from an alignment where a longitudinal axis of the spigot is within a plane defined by the securing ring, and 120°, such that the angular range is between +60° and −60° from an alignment where the longitudinal axis of the spigot is within a plane defined by the securing ring;
said one or two abutments being designed in such a way that they free the angular range of pivot if there is an increased load on the securing ring, and said one or two abutments have an intended point of fracture.

2. The securing eye of claim 1, wherein the spigot and the securing ring are formed from metal and said one or two abutments are formed from plastics material.

3. The securing eye of claim 1, wherein said one or two abutments are replaceable.

4. The securing eye of claim 2, wherein said one or two abutments are replaceable.

5. A securing system having a securing eye comprising:
a spigot;
a securing ring pivotably connected to the spigot; and
one or two abutments limiting an angular range of pivot of the securing ring to a range extending between 90°, such that the angular range is between +45° and −45° from an alignment where a longitudinal axis of the spigot is within a plane defined by the securing ring, and 120°, such that the angular range is between +60° and −60° from an alignment where the longitudinal axis of the spigot is within a plane defined by the securing ring; and
a securing bush in which the spigot of the securing eye is removeably insertable;
wherein said one or two abutments have an intended point of fracture.

6. The securing system of claim 5, wherein said one or two abutments being designed in such a way that they free the angular range of pivot if there is an increased load on the securing ring.

7. The securing system of claim 5, wherein the spigot and the securing ring are formed from metal and said one or two abutments are formed from plastics material.

8. The securing system of claim 5, wherein said one or two abutments are replaceable.

9. A securing eye comprising:
a spigot;
a securing ring pivotably connected to the spigot; and
one or two abutments limiting an angular range of pivot of the securing ring to a range extending between 90°, such that the angular range is between +45° and −45° from an alignment where a longitudinal axis of the spigot is within a plane defined by the securing ring, and 120°, such that the angular range is between +60° and −60° from an alignment where the longitudinal axis of the spigot is within a plane defined by the securing ring;
wherein the spigot and the securing ring are formed from metal and said one or two abutments are formed from plastics material; and
wherein said one or two abutments have an intended point of fracture.

* * * * *